United States Patent [19]

Bhatt

[11] Patent Number: 5,991,361

[45] Date of Patent: Nov. 23, 1999

[54] BEARING ASSEMBLY FOR X-RAY TUBE

[75] Inventor: Vivek Bhatt, Schenectady, N.Y.

[73] Assignee: General Electric Company, Schenectady, N.Y.

[21] Appl. No.: 09/013,175

[22] Filed: Jan. 26, 1998

[51] Int. Cl.[6] .................................................. H01J 35/10
[52] U.S. Cl. ........................................... 378/132; 378/125
[58] Field of Search ................................... 378/125, 132, 378/133

[56] References Cited

U.S. PATENT DOCUMENTS

| | | | |
|---|---|---|---|
| 3,694,685 | 9/1972 | Houston | 313/60 |
| 4,272,696 | 6/1981 | Stroble et al. | 378/132 |
| 4,519,093 | 5/1985 | Kurihara et al. | 378/132 |
| 4,949,368 | 8/1990 | Kubo | 378/132 |
| 4,956,858 | 9/1990 | Upadhya | 378/133 |
| 5,140,624 | 8/1992 | Chrisien | 378/132 |
| 5,483,570 | 1/1996 | Renshaw et al. | 378/132 |
| 5,541,975 | 7/1996 | Anderson et al. | 378/130 |
| 5,652,778 | 7/1997 | Tekriwal | 378/132 |

*Primary Examiner*—David P. Porta
*Attorney, Agent, or Firm*—Douglas E. Erickson; Marvin Snyder

[57] ABSTRACT

An X-ray tube bearing assembly has a first X-ray tube shaft with first and second ball-bearing raceway surfaces which are integral with (i.e., either monolithic portions of or fixedly attached to) the first shaft and has a second X-ray tube shaft with a third ball-bearing raceway surface which is integral with the second shaft. A ball-bearing race, which is non-integral with (i.e., neither a monolithic portion of nor fixedly attached to) the two shafts, has a fourth ball-bearing raceway surface. A first set of ball bearings is located between the first and third raceway surfaces, and a second set of ball bearings is located between the second and fourth raceway surfaces. Preferably, an anode target surface is attached to the first shaft, and a mechanism is provided to preload the ball-bearing race.

15 Claims, 2 Drawing Sheets

BEARING ASSEMBLY FOR X-RAY TUBE

FIELD OF THE INVENTION

The present invention relates generally to X-ray tubes, and more particularly to an X-ray tube assembly having a bearing.

BACKGROUND OF THE INVENTION

X-ray equipment used in the medical field typically includes a rotating anode X-ray tube. Such X-ray tubes are vacuum tubes each including a rotor having a rotatable shaft and each also including a stator which circumferentially surrounds, or is circumferentially surrounded by, the rotatable rotor shaft. An anode target surface is attached to, and rotated by, the rotor shaft. Electrons from a heated cathode strike the anode target surface to produce X-rays.

A pair of bearings is positioned radially between the rotor shaft and the stator. In a straddle-bearing design, the heavy anode target is located longitudinally between the two bearings, and the bearing arrangement is supported at both axial ends. Typically, each bearing includes a radially-outer race having a circumferential ball-bearing raceway surface, a radially-inner race having a circumferential ball-bearing raceway surface, and a set of circumferentially-arrayed ball bearings positioned radially between, and in rolling contact with, the raceway surfaces of the radially-outer and radially-inner races.

Usually, each of the two bearings is a pre-assembled bearing unit which is inserted between the rotor shaft and the stator. Since there is a clearance between the radially-inner races and the stator and a clearance between the radially-outer races and the rotor shaft, it is difficult to maintain the concentricity of the races which can lead to uneven wear of the ball bearings resulting in increased noise and reduced life of the X-ray tube. Also, under high speed rotation, the radially-inner and radially-outer races can start moving with respect to the rotor shaft and the stator making the bearing even more noisy.

Another known design replaces the pre-assembled bearing units with two radially-inner raceway surfaces which are integral with the stator, two radially-outer races which are separate pieces from the stator and the rotor shaft and which slide inside the rotor shaft, and two sets of ball bearings. Since there is a clearance between the radially-outer races and the rotor shaft, it is difficult to maintain the concentricity of these races which can lead to uneven wear of the roller bearings resulting in increased noise and reduced life of the X-ray tube. Also, under high speed rotation, the radially-outer races can start moving with respect to the rotor shaft making the bearing even more noisy. It is noted that radially-paired raceway surfaces together define load-bearing axes for the two sets of ball bearings. Such load-bearing axes typically are non-orthogonally-aligned with respect to the longitudinal axis of the rotor shaft, and a spring is used to apply a fixed longitudinal preload to one of the two radially-outer races. The fixed pre-load applied against one of the two radially-outer races somewhat reduces the bearing noise.

What is needed is an X-ray tube assembly having bearings which better maintain the concentricity of the bearing races and which further reduce bearing noise.

SUMMARY OF THE INVENTION

The X-ray tube bearing assembly of the invention includes first and second X-ray tube shafts, a ball-bearing race, apparatus for preventing rotation, and first and second sets of circumferentially-arrayed ball bearings. The first shaft has circumferential first and second ball-bearing raceway surfaces which are integral with the first shaft, which are longitudinally spaced apart from each other, and which are generally coaxially aligned with the longitudinal axis of the first shaft. The second shaft is generally coaxially aligned with the longitudinal axis and radially spaced apart from the first shaft. The second shaft has a circumferential third ball-bearing raceway surface which is integral with the second shaft and which is generally coaxially aligned with the longitudinal axis. The ball-bearing race is non-integral with the first and second shafts. The ball-bearing race includes a circumferential fourth ball-bearing raceway surface. The ball-bearing race is positioned radially between, and generally spaced apart from, the first and second shafts and near the second shaft. The fourth ball-bearing raceway surface is longitudinally spaced apart from the third ball-bearing raceway surface. The rotation prevention apparatus generally prevents rotation between the ball-bearing race and the second shaft. The first set of ball bearings is generally coaxially aligned with the longitudinal axis and is positioned radially between, and in rolling contact with, the first and third ball-bearing raceway surfaces. The second set of ball bearings is generally coaxially aligned with the longitudinal axis and is positioned radially between, and in rolling contact with, the second and fourth ball-bearing raceway surfaces. Preferably, an anode target surface is attached to, and rotated by, the first shaft and is located longitudinally between the first and second ball-bearing raceway surfaces. The X-ray tube bearing assembly preferably also includes a mechanism for exerting a longitudinal preload on the ball-bearing race, wherein the mechanism is adjustable to vary such longitudinal preload while the first and second sets of ball bearings remain disposed in their associated ball-bearing raceway surfaces.

Several benefits and advantages are derived from the invention. The X-ray tube bearing assembly has only one ball-bearing race which is a separate piece from the rotor shaft and the stator. This reduces bearing movement and noise over conventional designs. The two radially-outer raceway surfaces are integral with the rotor shaft. This better maintains the concentricity of these raceway surfaces, than do conventional designs, under the centrifugal forces of the two sets of rotating ball bearings. The adjustable preload mechanism allows adjusting the preload, after assembling the X-ray tube bearing assembly, to further reduce noise and bearing wear.

DETAILED DESCRIPTION OF THE INVENTION

Figure 1:
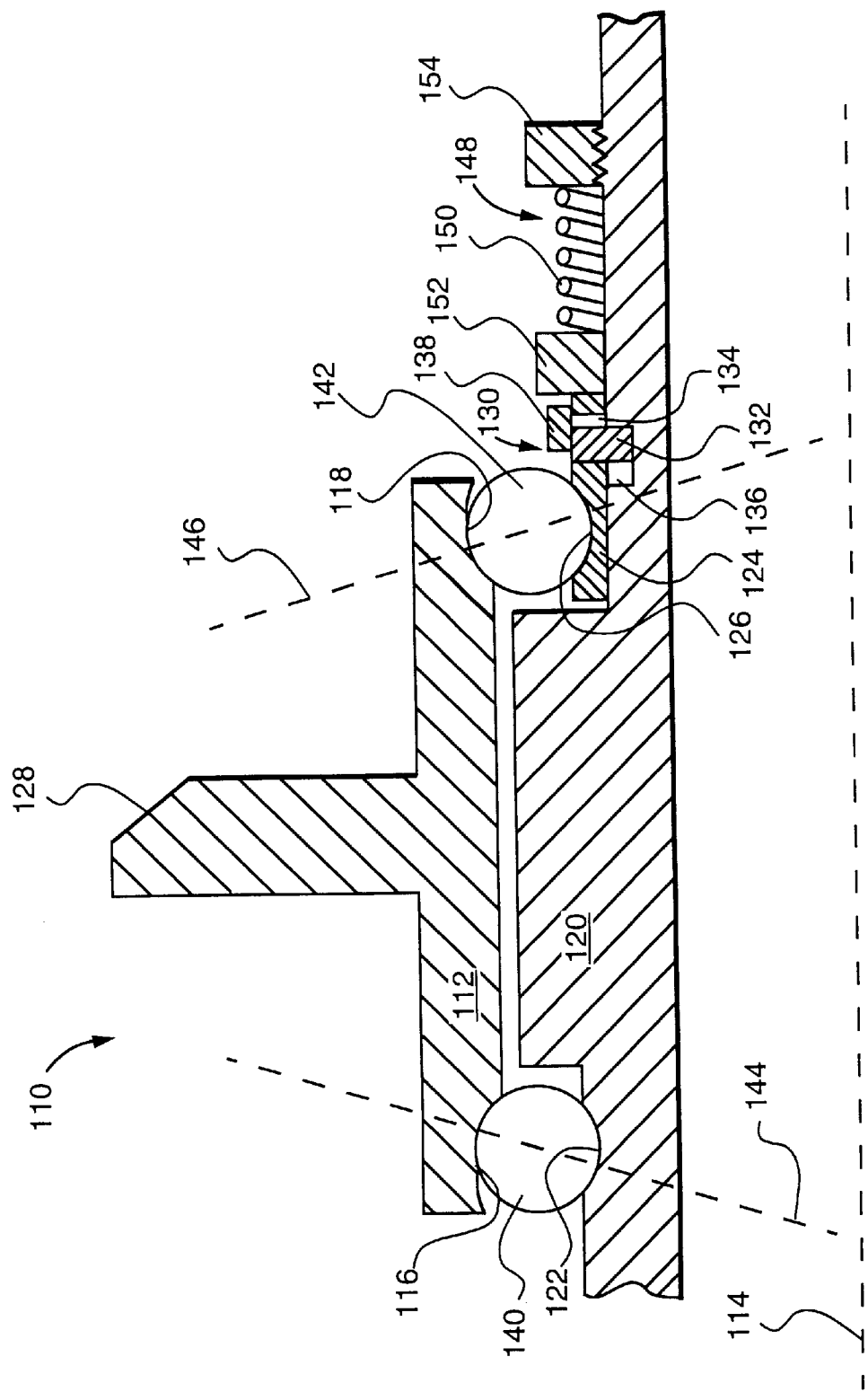
FIG. 1 is a schematic cross-sectional view of a first preferred embodiment of the X-ray tube bearing assembly of the present invention.

Referring now to the drawings, FIG. 1 schematically shows a first preferred embodiment of the X-ray tube bearing assembly 110 of the present invention. The X-ray tube bearing assembly 110 includes a first X-ray tube shaft 112 having a longitudinal axis 114 and having circumferential first and second ball-bearing raceway surfaces 116 and 118. It is noted that FIG. 1 schematically shows only that portion of the longitudinal cross section of the X-ray tube bearing assembly 110 which is above the longitudinal axis 114. The first and second ball-bearing raceway surfaces 116 and 118 are integral with the first X-ray tube shaft 112, longitudinally spaced apart from each other, and generally coaxially aligned with the longitudinal axis 114. By "integral with" is meant "a monolithic portion of or fixedly attached to". In a first preferred construction, as shown in FIG. 1, the first and second ball-bearing raceway surfaces 116 and 118 are formed out of a monolithic first X-ray tube shaft 112. In a second preferred construction, omitted from the figures, the first and second ball-bearing raceway surfaces are surfaces of shaft end portions which are welded or brazed to a shaft central portion, such three shaft portions having different metallurgical compositions.

The X-ray tube bearing assembly 110 also includes a second X-ray tube shaft 120 generally coaxially aligned with the longitudinal axis 114 and radially spaced apart from the first X-ray tube shaft 112. The second X-ray tube shaft 120 has a circumferential third ball-bearing raceway surface 122 which is integral with the second X-ray tube shaft 120 and which is generally coaxially aligned with the longitudinal axis 114. Again, by "integral" is meant "a monolithic portion of or fixedly attached to". In a first preferred construction, as shown in FIG. 1, the third ball-bearing raceway surface 122 is formed out of a monolithic second X-ray tube shaft 120. In a second preferred construction, omitted from the figures, the third ball-bearing raceway surface is a surface of a shaft end portion which is welded or brazed to a shaft central portion, such two shaft portions having different metallurgical compositions.

The X-ray tube bearing assembly 110 additionally includes a ball-bearing race 124 which is non-integral with the first and second X-ray tube shafts 112 and 120. By "non-integral" is meant "not a monolithic portion of and not fixedly attached to". The ball-bearing race 124 includes a circumferential fourth ball-bearing raceway surface 126. The ball-bearing race 124 is disposed radially between, and generally spaced apart from, the first and second X-ray tube shafts 112 and 120 and proximate the second X-ray tube shaft 120. A preferred clearance between the ball-bearing race 124 and the second X-ray tube shaft 120 is between generally 0.2 and generally 1.0 thousandths of an inch. The fourth ball-bearing raceway surface 126 is longitudinally spaced apart from the third ball-bearing raceway surface 122.

In a preferred construction, the first X-ray tube shaft 112 generally circumferentially surrounds the second X-ray tube shaft 120. Preferably, the first X-ray tube shaft 112 is a rotatable shaft, and the second X-ray tube shaft 120 is a stationary shaft. The X-ray tube bearing assembly 110 preferably includes an anode target surface 128 attached to, and rotated by, the first X-ray tube shaft 112. In an exemplary enablement, the anode target surface 128 is disposed longitudinally between the first and second ball-bearing raceway surfaces 116 and 118 providing a straddle-bearing support. A less preferred arrangement, not shown in the figures, would be to have the first and second ball-bearing raceway surfaces disposed longitudinally to the same side of the anode target surface to provide an overhung support. Preferably, the second X-ray tube shaft 120 is an annular shaft and is attached to a stationary frame which is surrounded by a casing, such frame and casing (omitted from the figures for clarity) being conventionally known to the artisan.

The X-ray tube bearing assembly 110 further includes means 130 for generally preventing rotation between the ball-bearing race 124 and the second X-ray tube shaft 120. Preferably such rotation-prevention means 130 includes a key 132 longitudinally placed in a through slot 134 of the annular ball-bearing race 124, such key 132 further extending into a non-circumferential surface notch 136 in the second X-ray tube shaft 120 and prevented from falling out by an annular cover 138 which preferably is affixed to the ball-bearing race 124. Other such rotation-prevention means, not shown in the figures, include the second X-ray tube shaft and the ball-bearing race together having a longitudinally-extending tongue and groove engagement on their opposing circumferential surfaces, or the second X-ray tube shaft and the ball-bearing race together having a pin and hole engagement on opposing and longitudinally-facing surfaces, and the like.

The X-ray tube bearing assembly 110 moreover includes a first set of circumferentially-arrayed ball bearings 140 and a second set of circumferentially-arrayed ball bearings 142. The first set of ball bearings 140 is generally coaxially aligned with the longitudinal axis 114 and is disposed radially between, and in rolling contact with, the first and third ball-bearing raceway surfaces 116 and 122. The second set of ball bearings 142 is generally coaxially aligned with the longitudinal axis 114 and is disposed radially between, and in rolling contact with, the second and fourth ball-bearing raceway surfaces 118 and 126.

The first and the third ball-bearing raceway surfaces 116 and 122 together define, in longitudinal cross section, a first load-bearing axis 144 for the first set of ball bearings 140. The second and the fourth ball-bearing raceway surfaces 118 and 126 together define, in longitudinal cross section, a second load-bearing axis 146 for the second set of ball bearings 142. By "longitudinal cross section" is meant that the longitudinal axis 114 lies in the cross-sectioning plane. It is again noted that FIG. 1 is a longitudinal cross section of the X-ray tube bearing assembly 110. The first and second load-bearing axes 144 and 146 each are non-orthogonally aligned with the longitudinal axis 114. Preferably, the first load-bearing axis 144 extends from the first set of ball bearings 140 towards the longitudinal axis 114 and away from the second set of ball bearings 142, and the second load-bearing axis 146 extends from the second set of ball bearings 142 towards the longitudinal axis 114 and away from the first set of ball bearings 140. This is known as a duplex back-to-back arrangement which has better moment carrying capacity.

In an exemplary embodiment, the X-ray tube bearing assembly 110 includes means 148 for exerting a longitudinal preload on the ball-bearing race 124. Preferably, such preload-exerting means 148 includes a spring 150 which is under compression, wherein the second set of ball bearings 142 is disposed longitudinally between the spring 150 and the first set of ball bearings 140. Other such preload-exerting means, not shown in the figures, include the use of an elastomeric substance, a spring under tension, magnetic attraction or repulsion, and the like, as can be appreciated by the artisan. In a preferred embodiment, the preload-exerting means 148 is adjustable to vary the longitudinal preload exerted on the ball-bearing race 124 while the first set of ball bearings 140 remains disposed in the first and third ball-bearing raceway surfaces 116 and 122 and while the second set of ball bearings 142 remains disposed in the second and fourth ball-bearing raceway surfaces 118 and 126. Preferably, the adjustment is accomplished by disposing the spring 150 (or the elastomeric substance or the magnet) between and in contact with a loader ring 152 and a nut 154, wherein the loader ring 152 surrounds the second X-ray tube shaft 120 and contacts the ball-bearing race 124 and wherein the nut 154 threadably engages the second X-ray tube shaft 120. Adjustment of the nut 154 will vary the preload, as can be appreciated by the artisan. Other adjustment mechanisms, not shown in the figures, include substituting different-strength springs (or elastomers or magnets), and the like. The preload is known to significantly affect the noise level and the life of the X-ray tube ball-bearing subassembly (i.e., the ball bearings, ball-bearing race, and raceway surfaces). The X-ray tube bearing assembly 110 allows the preload to be adjusted to further reduce noise and bearing wear, without having to take apart the bearing assembly 110 and put it back together.

The X-ray tube bearing assembly 110 is easy to assemble. A preferred method for assembling the X-ray tube bearing assembly 110 is as follows, with directions taken from FIG. 1. Put the first X-ray tube shaft 112 and the second X-ray tube shaft 120 together with the first X-ray tube shaft 112 shifted longitudinally to the right to facilitate the introduction of the first set of ball bearings 140 between the first and third ball-bearing raceway surfaces 116 and 122. Drop in the first set of ball bearings 140. Shift the first X-ray tube shaft 112 longitudinally towards the left to seat the first set of ball bearings 140. Support this arrangement vertically on the second X-ray tube shaft 120 such that the former left end is facing downward and the second X-ray tube shaft 120 is unsupported except through the first set of ball bearings 140. Slide in the ball-bearing race 124. Drop in the second set of ball bearings 142 between the second and fourth ball-bearing raceway surfaces 118 and 126 and push the ball-bearing race 124 downward. Insert the key 132 through the slot 134 and into the notch 136. Put on the cover 138 to prevent the key 132 from falling out. Put on the loader ring 152, the spring 150, and the nut 154. Tighten the nut 154 to give the desired preload to the ball-bearing race 124.

Figure 2:
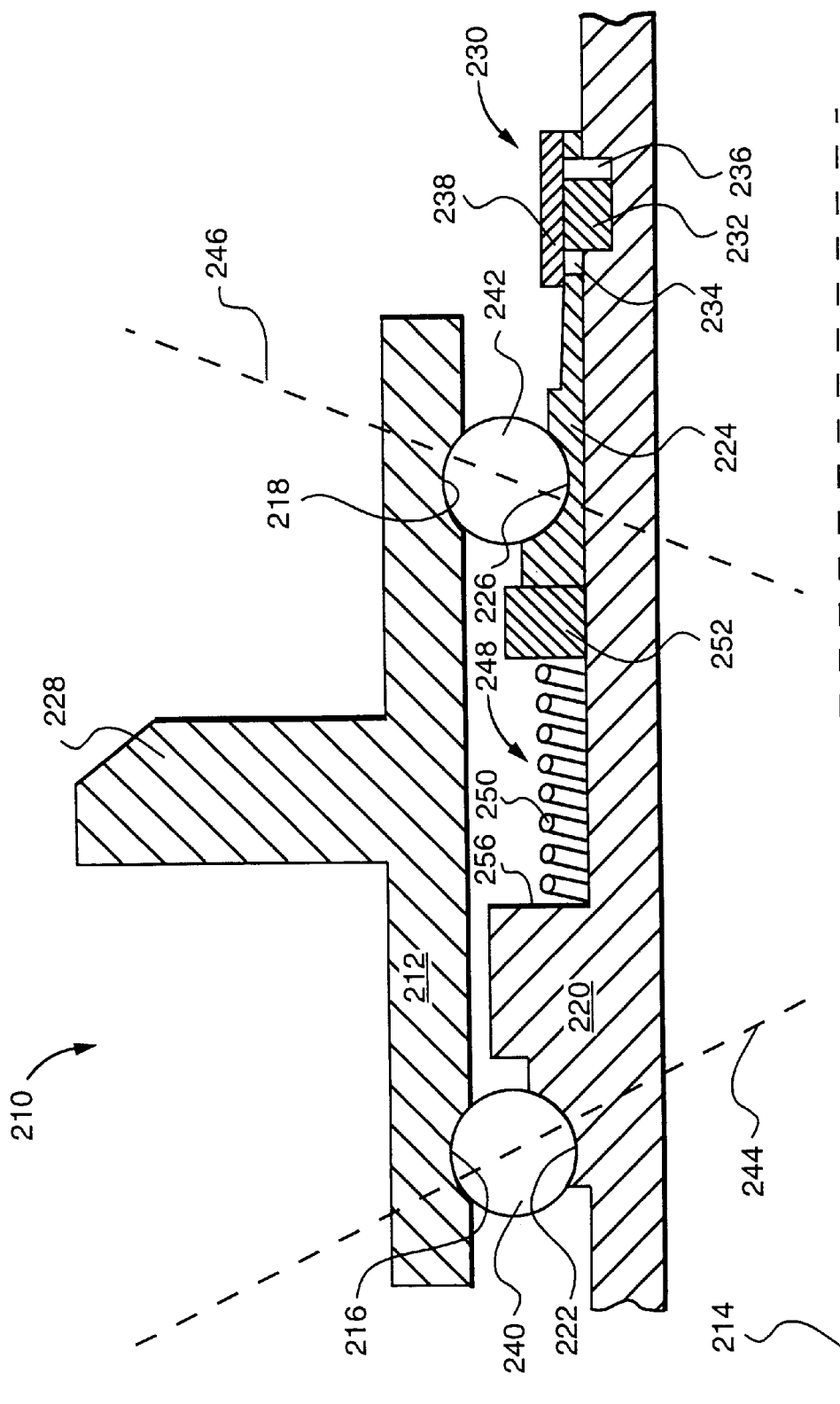
FIG. 2 is a schematic cross-sectional view of a second preferred embodiment of the X-ray tube bearing assembly of the present invention.

Referring again to the drawings, FIG. 2 schematically shows a second preferred embodiment of the X-ray tube bearing assembly 210 of the present invention. It is noted that FIG. 2 schematically shows only that portion of the longitudinal cross section of the X-ray tube bearing assembly 210 which is above the longitudinal axis 214. X-ray tube bearing assembly 210 is identical to previously-described X-ray tube bearing assembly 110, including the anode target surface 228 being attached to the first X-ray tube shaft 212, but with differences as hereinafter noted. The first load-bearing axis 244 extends from the first set of ball bearings 240 towards the longitudinal axis 214 and towards the second set of ball bearings 242, and the second load-bearing axis 246 extends from the second set of ball bearings 242 towards the longitudinal axis 214 and towards the first set of ball bearings 240. This is known as a duplex front-to-front arrangement. The preload-exerting means 248 includes a spring 250 which is under compression and which is disposed longitudinally between the first and second sets of ball bearings 240 and 242. Preferably, the spring 250 is disposed between and in contact with a loader ring 252 and a longitudinally-facing annular flange 256, wherein the loader ring 252 surrounds the second X-ray tube shaft 220 and contacts the ball-bearing race 224. Such preload-exerting means 248 is not adjustable without taking apart the X-ray tube bearing assembly 210.

A preferred method for assembling the X-ray tube bearing assembly 210 is as follows, with directions taken from FIG. 2. Put the first X-ray tube shaft 212 and the second X-ray tube shaft 220 together with the first X-ray tube shaft 212 shifted longitudinally to the right to facilitate the introduction of the first set of ball bearings 240 between the first and third ball-bearing raceway surfaces 216 and 222. Drop in the first set of ball bearings 240. Shift the first X-ray tube shaft 212 longitudinally towards the left to seat the first set of ball bearings 240. Support this arrangement vertically on the second X-ray tube shaft 220 such that the former left end is facing downward and the second X-ray tube shaft 220 is unsupported except through the first set of ball bearings 240. Drop in the spring 250 and the loader ring 252. Slide in the ball-bearing race 224. Push the ball-bearing race 224 downward, compressing the spring 250 enough to get sufficient clearance to drop in the second set of ball bearings 242 between the second and fourth ball-bearing raceway surfaces 218 and 226. Drop in the second set of ball bearings 242 and release the ball-bearing race 224 so that the spring 250 preloads the ball-bearing race 224 and snaps the ball-bearing race 224 into place. To install the rotation-prevention means 230, insert the key 232 through the slot 234 and into the notch 236. Put on the cover 238 to prevent the key 232 from falling out.

The foregoing description of several preferred embodiments of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. An X-ray tube bearing assembly comprising:
    a) a first X-ray tube shaft having a longitudinal axis and having circumferential first and second ball-bearing raceway surfaces which are integral with said first X-ray tube shaft, which are longitudinally spaced apart from each other, and which are generally coaxially aligned with said longitudinal axis;
    b) a second X-ray tube shaft generally coaxially aligned with said longitudinal axis, radially spaced apart from said first X-ray tube shaft, and having a circumferential third ball-bearing raceway surface which is integral with said second X-ray tube shaft and which is generally coaxially aligned with said longitudinal axis;
    c) a ball-bearing race, wherein said ball-bearing race is non-integral with said first and second X-ray tube shafts, wherein said ball-bearing race includes a circumferential fourth ball-bearing raceway surface, wherein said ball-bearing race is disposed radially between, and generally spaced apart from, said first and second X-ray tube shafts and proximate said second X-ray tube shaft, and wherein said fourth ball-bearing raceway surface is longitudinally spaced apart from said third ball-bearing raceway surface;
    d) means for generally preventing rotation between said ball-bearing race and said second X-ray tube shaft;
    e) a first set of circumferentially-arrayed ball bearings generally coaxially aligned with said longitudinal axis and disposed radially between, and in rolling contact with, said first and third ball-bearing raceway surfaces; and
    f) a second set of circumferentially-arrayed ball bearings generally coaxially aligned with said longitudinal axis and disposed radially between, and in rolling contact with, said second and fourth ball-bearing raceway surfaces.

2. The X-ray tube bearing assembly of claim 1, wherein said first X-ray tube shaft generally circumferentially surrounds said second X-ray tube shaft.

3. The X-ray tube bearing assembly of claim 2, wherein said first X-ray tube shaft is a rotatable shaft and wherein said second X-ray tube shaft is a stationary shaft.

4. The X-ray tube bearing assembly of claim 3, also including an anode target surface attached to, and rotated by, said first X-ray tube shaft.

5. The X-ray tube bearing assembly of claim 4, wherein said anode target surface is disposed longitudinally between said first and second ball-bearing raceway surfaces.

6. The X-ray tube bearing assembly of claim 5, wherein said first and third ball-bearing raceway surfaces together define a first load-bearing axis for said first set of ball bearings, wherein said second and fourth ball-bearing raceway surfaces together define a second load-bearing axis for said second set of ball bearings, and wherein said first and second load-bearing axes each are non-orthogonally aligned with said longitudinal axis.

7. The X-ray tube bearing assembly of claim 6, also including means for exerting a longitudinal preload on said ball-bearing race.

8. The X-ray tube bearing assembly of claim 7, wherein said first load-bearing axis extends from said first set of ball bearings towards said longitudinal axis and away from said second set of ball bearings, and wherein said second load-bearing axis extends from said second set of ball bearings towards said longitudinal axis and away from said first set of ball bearings.

9. The X-ray tube bearing assembly of claim 8, wherein said preload-exerting means includes a spring which is under compression and wherein said second set of ball bearings is disposed longitudinally between said spring and said first set of ball bearings.

10. The X-ray tube bearing assembly of claim 9, wherein said preload-exerting means is adjustable to vary the longitudinal preload exerted on said ball-bearing race while said first set of ball bearings remains disposed in said first and third ball-bearing raceway surfaces and while said second set of ball bearings remains disposed in said second and fourth ball-bearing raceway surfaces.

11. The X-ray tube bearing assembly of claim 7, wherein said first load-bearing axis extends from said first set of ball bearings towards said longitudinal axis and towards said second set of ball bearings, and wherein said second load-bearing axis extends from said second set of ball bearings towards said longitudinal axis and towards said first set of ball bearings.

12. The X-ray tube bearing assembly of claim 11, wherein said preload-exerting means includes a spring which is under compression and which is disposed longitudinally between said first and second sets of ball bearings.

13. The x-ray tube bearing assembly of claim 1, wherein said rotation-preventing means includes means, other than friction, for generally preventing rotation between said ball-bearing race and said second X-ray tube shaft.

14. An X-ray tube bearing assembly comprising:
   a) a first X-ray tube shaft having a longitudinal axis and including monolithic shaft end portions having circumferential first and second ball-bearing raceway surfaces which are longitudinally spaced apart from each other and which are generally coaxially aligned with said longitudinal axis;
   b) a second X-ray tube shaft generally coaxially aligned with said longitudinal axis, radially spaced apart from said first X-ray tube shaft, and including a monolithic shaft end portion having a circumferential third ball-bearing raceway surface which is generally coaxially aligned with said longitudinal axis;
   c) a ball-bearing race, wherein said ball-bearing race is non-integral with said first and second X-ray tube shafts, wherein said ball-bearing race includes a circumferential fourth ball-bearing raceway surface, wherein said ball-bearing race is disposed radially between, and generally spaced apart from, said first and second X-ray tube shafts and proximate said second X-ray tube shaft, and wherein said fourth ball-bearing raceway surface is longitudinally spaced apart from said third ball-bearing raceway surface;
   d) means for generally preventing rotation between said ball-bearing race and said second X-ray tube shaft;
   e) a first set of circumferentially-arrayed ball bearings generally coaxially aligned with said longitudinal axis and disposed radially between, and in rolling contact with, said first and third ball-bearing raceway surfaces; and
   f) a second set of circumferentially-arrayed ball bearings generally coaxially aligned with said longitudinal axis and disposed radially between, and in rolling contact with, said second and fourth ball-bearing raceway surfaces.

15. An X-ray tube bearing assembly comprising:
   a) a first X-ray tube shaft having a longitudinal axis and including welded or brazed shaft end portions having circumferential first and second ball-bearing raceway surfaces which are longitudinally spaced apart from each other and which are generally coaxially aligned with said longitudinal axis;
   b) a second X-ray tube shaft generally coaxially aligned with said longitudinal axis, radially spaced apart from said first X-ray tube shaft, and including a welded or brazed shaft end portion having a circumferential third ball-bearing raceway surface which is generally coaxially aligned with said longitudinal axis;
   c) a ball-bearing race, wherein said ball-bearing race is non-integral with said first and second X-ray tube shafts, wherein said ball-bearing race includes a circumferential fourth ball-bearing raceway surface, wherein said ball-bearing race is disposed radially between, and generally spaced apart from, said first and second X-ray tube shafts and proximate said second X-ray tube shaft, and wherein said fourth ball-bearing raceway surface is longitudinally spaced apart from said third ball-bearing raceway surface;
   d) means for generally preventing rotation between said ball-bearing race and said second X-ray tube shaft;
   e) a first set of circumferentially-arrayed ball bearings generally coaxially aligned with said longitudinal axis and disposed radially between, and in rolling contact with, said first and third ball-bearing raceway surfaces; and
   f) a second set of circumferentially-arrayed ball bearings generally coaxially aligned with said longitudinal axis and disposed radially between, and in rolling contact with, said second and fourth ball-bearing raceway surfaces.

* * * * *